(12) United States Patent
Tseng (10) Patent No.: US 9,347,471 B2
(45) Date of Patent: May 24, 2016

(54) FLOATING FASTENER MOUNTING STRUCTURE

(71) Applicant: HANWIT PRECISION INDUSTRIES LTD., New Taipei (TW)

(72) Inventor: Ying-Chih Tseng, New Taipei (TW)

(73) Assignee: HANWIT PRECISION INDUSTRIES LTD., New Taipei (TW)

( * ) Notice: Subject to any disclaimer, the term of this patent is extended or adjusted under 35 U.S.C. 154(b) by 0 days.

(21) Appl. No.: 14/614,983

(22) Filed: Feb. 5, 2015

(65) Prior Publication Data

US 2015/0147133 A1 May 28, 2015

Related U.S. Application Data

(63) Continuation of application No. 13/607,759, filed on Sep. 9, 2012, now abandoned.

(51) Int. Cl.
*F16B 21/18* (2006.01)
*F16B 5/02* (2006.01)

(52) U.S. Cl.
CPC .......... *F16B 5/0208* (2013.01); *Y10T 29/49948* (2015.01)

(58) Field of Classification Search
CPC ...... F16B 5/0208; F16B 5/0266; F16B 21/16; F16B 21/18; F16B 37/068
USPC ................................. 411/180, 347, 349, 353
See application file for complete search history.

(56) References Cited

U.S. PATENT DOCUMENTS

| | | | |
|---|---|---|---|
| 3,059,736 A * | 10/1962 | Boyd | F16B 41/002 29/512 |
| 3,180,389 A | 4/1965 | Frank | |
| 3,250,559 A * | 5/1966 | Sommerfeld | F16B 5/0208 29/512 |
| 3,343,581 A * | 9/1967 | Martin | F16B 5/0208 292/251 |
| 4,952,107 A * | 8/1990 | Dupree | F16B 41/002 411/103 |
| 5,251,370 A | 10/1993 | Muller et al. | |
| 5,335,411 A | 8/1994 | Muller et al. | |
| 5,336,028 A * | 8/1994 | Yamamoto | F16B 5/0208 403/21 |
| 5,382,124 A | 1/1995 | Frattarola | |
| 5,851,095 A | 12/1998 | Ellis et al. | |
| 6,238,155 B1 | 5/2001 | Aukzemas et al. | |
| 6,280,131 B1 | 8/2001 | Ellis et al. | |
| 6,468,012 B2 | 10/2002 | Ellis et al. | |
| 6,722,052 B2 | 4/2004 | Wu | |
| 6,786,691 B2 * | 9/2004 | Alden, III | F16B 35/041 411/352 |
| 6,955,512 B2 * | 10/2005 | Allen | F16B 21/186 211/26 |
| 7,213,321 B2 * | 5/2007 | Franco | F16B 5/0208 29/453 |
| 7,905,696 B2 | 3/2011 | Chiu | |
| 7,938,607 B2 | 5/2011 | Wang | |

(Continued)

*Primary Examiner* — Roberta Delisle
(74) *Attorney, Agent, or Firm* — Muncy, Geissler, Olds & Lowe, P.C.

(57) ABSTRACT

A floating fastener mounting structure includes a metal panel member defining a convex wall portion and a mounting through hole at the convex wall portion, a mounting socket including an axially extended center hole, an annular step and a stop flange extended around the periphery at different elevations and an annular locating groove defined between the annular step and the stop flange. The mounting socket is riveted to the metal panel member to force the annular locating groove into engagement with the convex wall portion, enabling the convex wall portion to be tightly stopped between the annular step and the stop flange. The annular step defines a downwardly and outwardly sloping top surface for guiding the convex wall portion of the metal panel member into engagement with the annular locating groove of the mounting socket in the rivet operation.

9 Claims, 8 Drawing Sheets

(56) References Cited

U.S. PATENT DOCUMENTS

| | | |
|---|---|---|
| 8,066,461 B2 | 11/2011 | Travers |
| 8,087,861 B2 | 1/2012 | Wang |
| 8,371,786 B2 | 2/2013 | Chiu |
| 8,388,288 B2 | 3/2013 | Chiu |
| 8,827,614 B2 | 9/2014 | Tseng |
| 2006/0137166 A1 | 6/2006 | Babej et al. |
| 2009/0202319 A1* | 8/2009 | Wang .................. F16B 5/0208 411/353 |
| 2010/0290861 A1 | 11/2010 | Wang |
| 2010/0290864 A1* | 11/2010 | Wang .................. F16B 5/0208 411/383 |
| 2011/0070049 A1* | 3/2011 | Wang .................. F16B 5/0208 411/372.6 |
| 2011/0302759 A1 | 12/2011 | Chiu |
| 2011/0308065 A1 | 12/2011 | Wang |
| 2012/0224935 A1 | 9/2012 | Chiu |
| 2012/0237315 A1 | 9/2012 | Chiu |
| 2012/0237316 A1 | 9/2012 | Chiu |

* cited by examiner

FLOATING FASTENER MOUNTING STRUCTURE

This application is a Continuation of application Ser. No. 13/607,759, filed on Sep. 9, 2012, for which priority is claimed under 35 U.S.C. §120, the entire contents of which are hereby incorporated by reference.

BACKGROUND OF THE INVENTION

1. Field of the Invention

The present invention relates to floating fastener mounting technology and more particularly, to a floating fastener mounting structure that enhances the strength of the connected structure between a mounting socket and a metal panel member, wherein the mounting socket comprises an annular step and a stop flange extended around the periphery thereof at different elevation, and a annular locating groove defined between the annular step and the stop flange; the metal panel member comprises a mounting through hole for the insertion of the mounting socket, and a convex wall portion disposed around the mounting through hole engaged into the annular locating groove of the mounting socket and tightly stopped between the annular step and the stop flange to enhance the shear strength of the floating fastener mounting structure.

2. Description of the Related Art

When joining metal panel members, fastening devices respectively formed of a lock screw, a rotary knob and a washer may be used. During application, the lock screw, rotary knob and washer of each fastening device are assembled and then mounted at a first metal panel member. When fastening the first metal panel member to a second metal panel member, rotate the rotary knob of each fastening device to drive the respective lock screw into a respective mounting screw hole at the second metal panel member, and then use a hand tool to fasten tight the lock screw. This multiple metal panel member fastening method can be used in a machine tool or other situations where multiple metal panel members are to be fastened in a stack. In a machine tool, the location where metal panel members are fastened together may be at the power drive or speed-adjustment unit inside the housing. The lock screws of the fastening devices may fall from the metal panel members and missed easily due to user's negligence during a metal panel member dismounting procedure for the performance of a repair or speed adjustment operation, affecting further re-installation operation.

Figure 8:
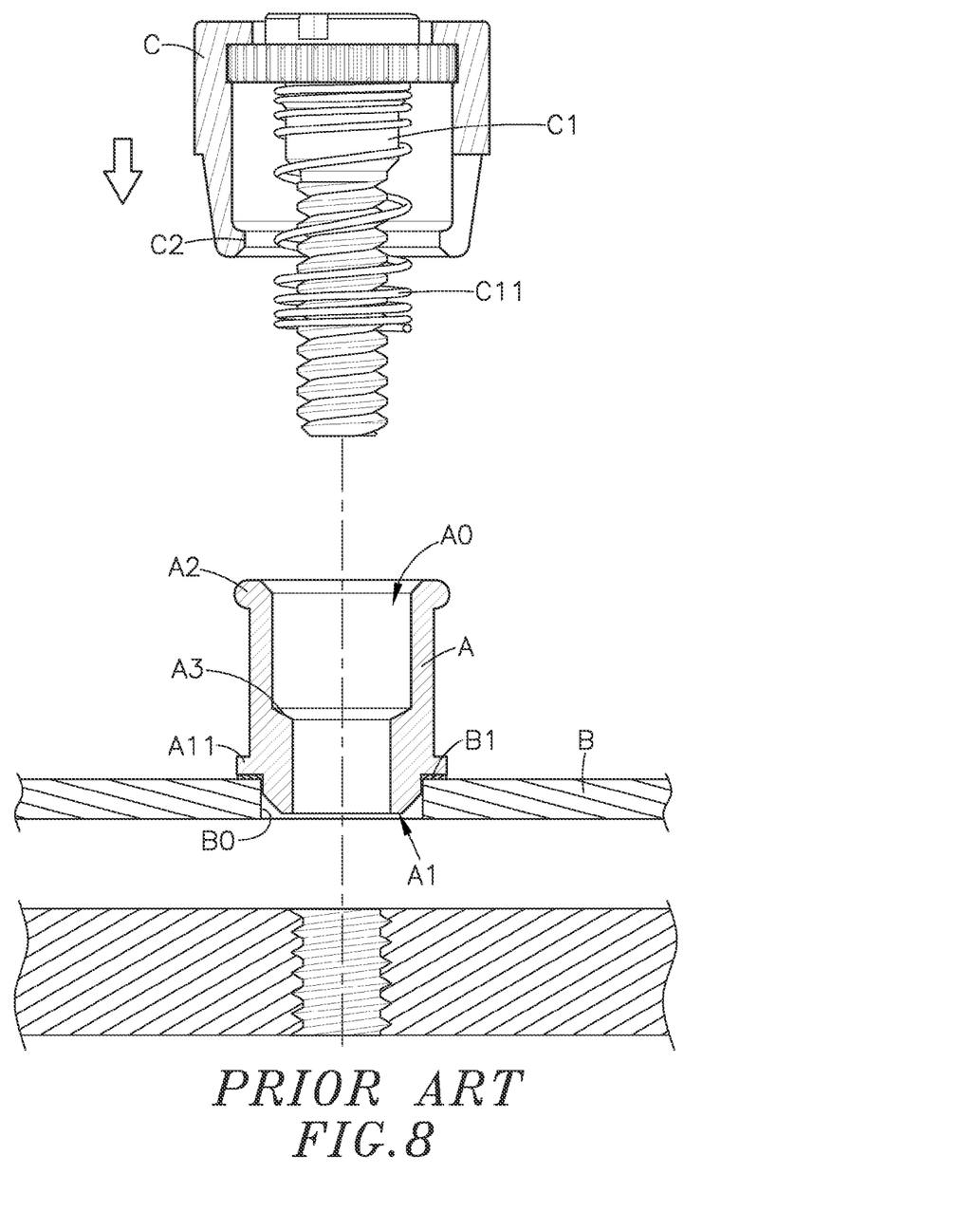
FIG. 8 is an exploded view of a floating fastener according to the prior art.

To avoid the aforesaid problem, floating fasteners are created. A floating fastener is known comprising a mounting socket A that comprises a bottom mounting portion A1 inserted into a mounting through hole B0 at a metal panel member B and welded thereto, a lock screw C1 inserted through a center hole A0 of the mounting socket A, a spring member C11 mounted around the shank of the lock screw C1 and stopped between an inside step A3 in the center hole A0 of the mounting socket A and the head of the lock screw C1 to floatably support the lock screw C1 in the mounting socket A, and a cap member C affixed to the head of the lock screw C1 and having an inside coupling flange C2 protruded from the inner perimeter thereof at a bottom side and slidably coupled to the outer perimeter of the mounting socket 1 between an external top annular flange A2 and an stop flange A11 of the mounting socket A. This design of floating fastener still has drawbacks as follows:

1. The bottom mounting portion A1 of the mounting socket A is inserted into the mounting through hole B0 of metal panel member B and attached to a solder paste B1 at the top wall of the metal panel member B around the mounting through hole B0 and then welded thereto through reflow soldering. Due to limited contact surface area between the mounting socket A and the metal panel member B, the structural strength between the mounting socket A and the metal panel member B is not strong enough, and the bottom mounting portion A1 of the mounting socket A may break easily when the mounting socket A is stretched accidentally by an external force.
2. When coupling the inside coupling flange C2 of the cap member C to the outer perimeter of the mounting socket 1 between the external top annular flange A2 and the stop flange A11 of the mounting socket A, the applied force may stretch the mounting socket A, loosening the mounting socket A or even forcing the mounting socket A out of place.

Therefore, there is a strong demand for a floating fastener that eliminates the drawbacks of the aforesaid prior art design and that provides a high structural strength for repeated use.

SUMMARY OF THE INVENTION

The present invention has been accomplished under the circumstances in view. It is therefore the main object of the present invention to provide a floating fastener mounting structure, which facilitates quick installation and provides high structural strength and enhanced shear strength, avoiding accidental breaking.

To achieve this and other objects of the present invention, the floating fastener mounting structure comprises a metal panel member and a mounting socket. The metal panel member defines a convex wall portion and a mounting through hole cut through the convex wall portion. The mounting socket comprises a center hole vertically extending through the opposing top and bottom sides thereof, an annular step and a stop flange extended around the outer perimeter thereof at different elevations, and an annular locating groove defined between the annular step and the stop flange. The mounting socket is riveted to the metal panel member to force the annular locating groove into engagement with the convex wall portion, enabling the convex wall portion to be tightly stopped between the annular step and the stop flange. The annular step defines a downwardly and outwardly sloping top surface for guiding the convex wall portion of the metal panel member into engagement with the annular locating groove of the mounting socket in the rivet operation. After riveting, the convex wall portion of the metal panel member is engaged into the annular locating groove and tightly stopped between the annular step and the stop flange to prohibit the mounting socket from displacement relative to the metal panel member, enhancing the structural strength of the connection area between the mounting socket and the metal panel member and the shear strength of the whole assembly against breaking.

Further, the mounting socket comprises a transverse partition wall disposed in the center hole, and a through hole cut through opposing top and bottom sides of the transverse partition wall at the center. The lock screw comprises a head disposed outside the mounting socket, and a shank perpendicularly and downwardly extended from a bottom wall of the head at the center and terminating in a screw rod and inserted through the through hole on the transverse partition wall in the center hole of the mounting socket. The spring member is mounted around the shank of the lock screw in the center hole of the mounting socket and stopped between the head of the lock screw and the top side of the transverse partition wall of the mounting socket. Further, a C-shaped retainer is clamped on the shank of the lock screw and stopped between a bottom edge of the transverse partition wall of the mounting socket and the screw rod of the lock screw.

In an alternate form of the present invention, the aforesaid C-shaped retainer is eliminated, and the lock screw is fixedly mounted with a cap member that is axially slidably coupled to the mounting socket. The cap member is affixed to the head of the lock screw and axially slidably coupled to the outer perimeter of the mounting socket between an external top annular flange and the annular step of the mounting socket.

DETAILED DESCRIPTION OF THE PREFERRED EMBODIMENT

Figure 1:
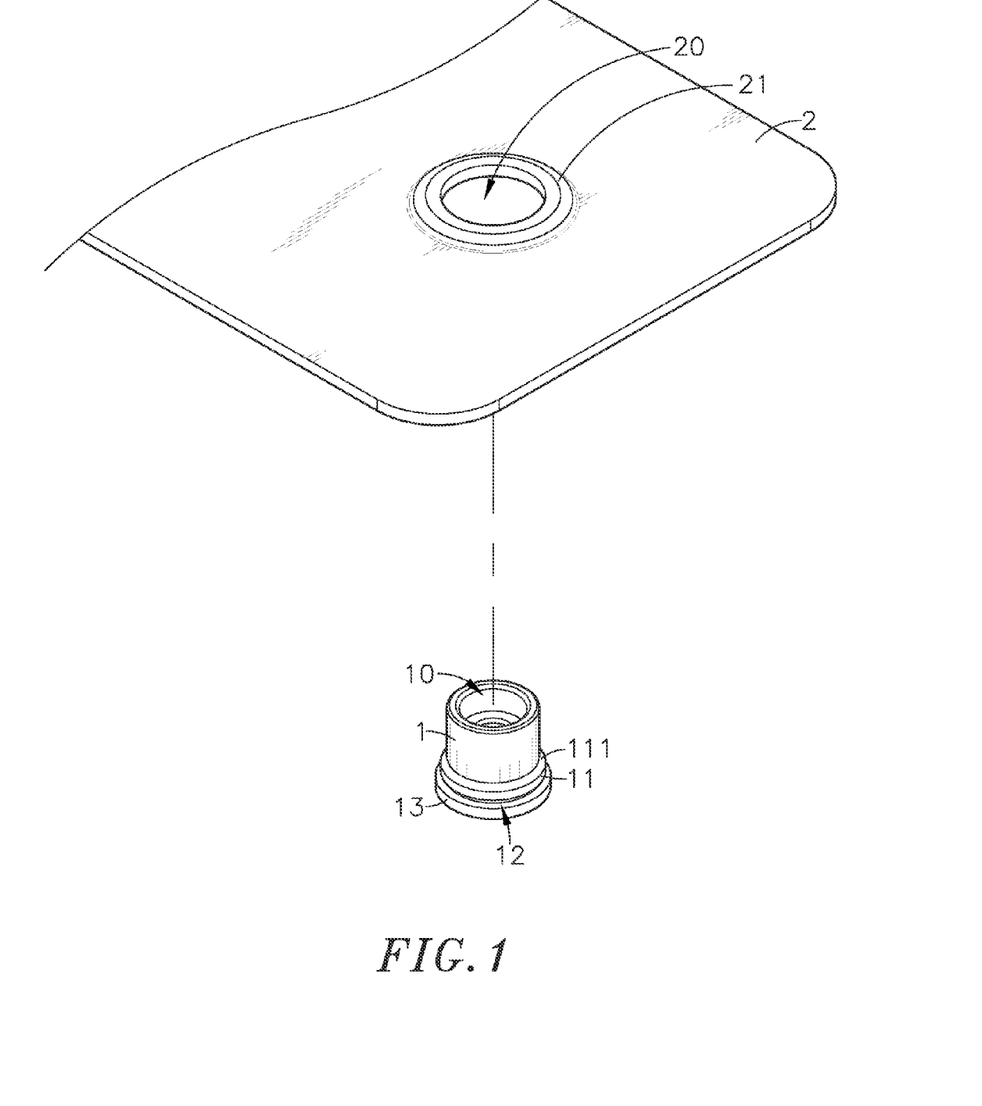
FIG. 1 is an exploded view of a mounting socket and a metal panel member of a floating fastener mounting structure in accordance with the present invention.
Figure 2:
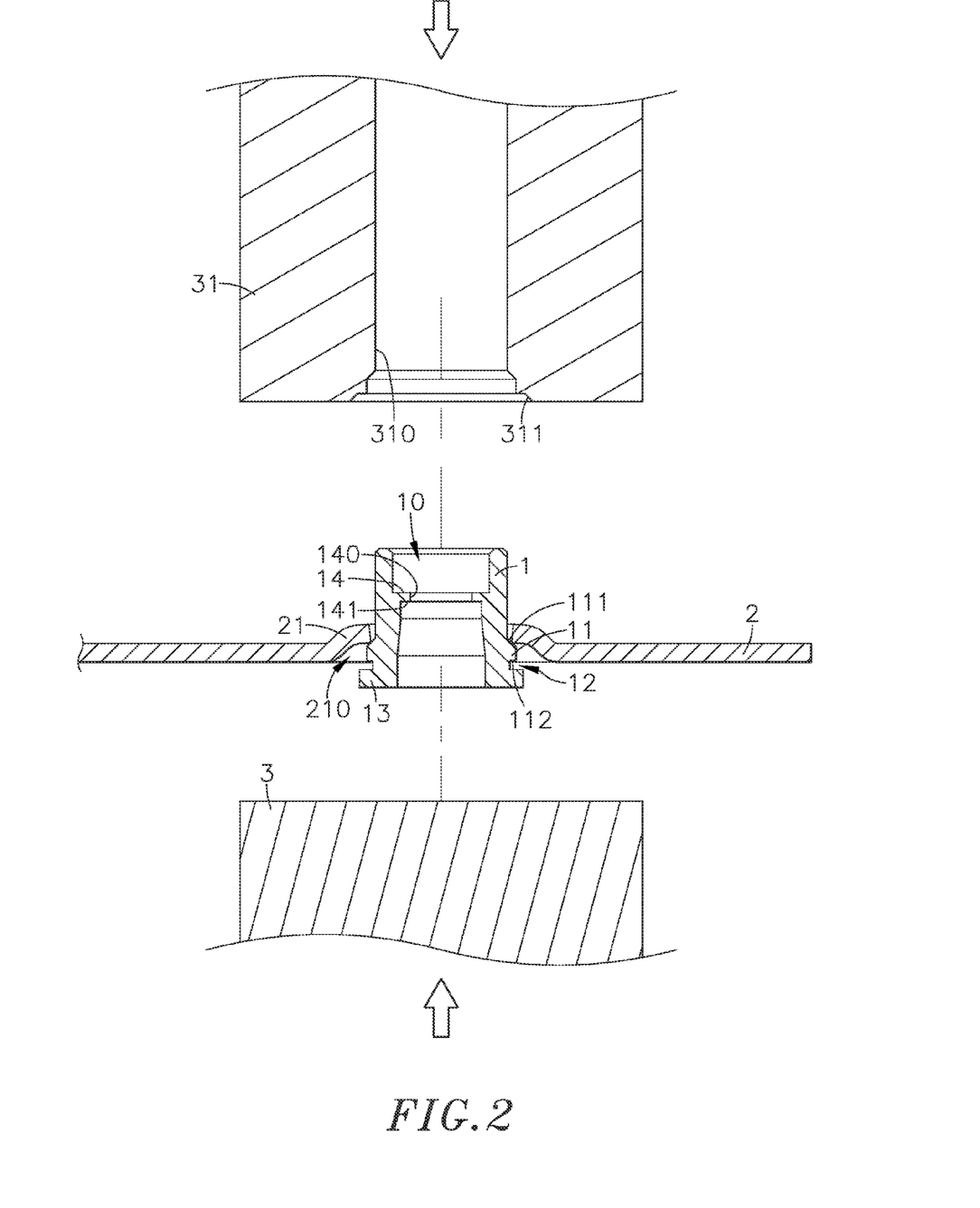
FIG. 2 is a schematic sectional view, illustrating the mounting socket and the metal panel member temporarily secured together for riveting in a stamping press.
Figure 3:
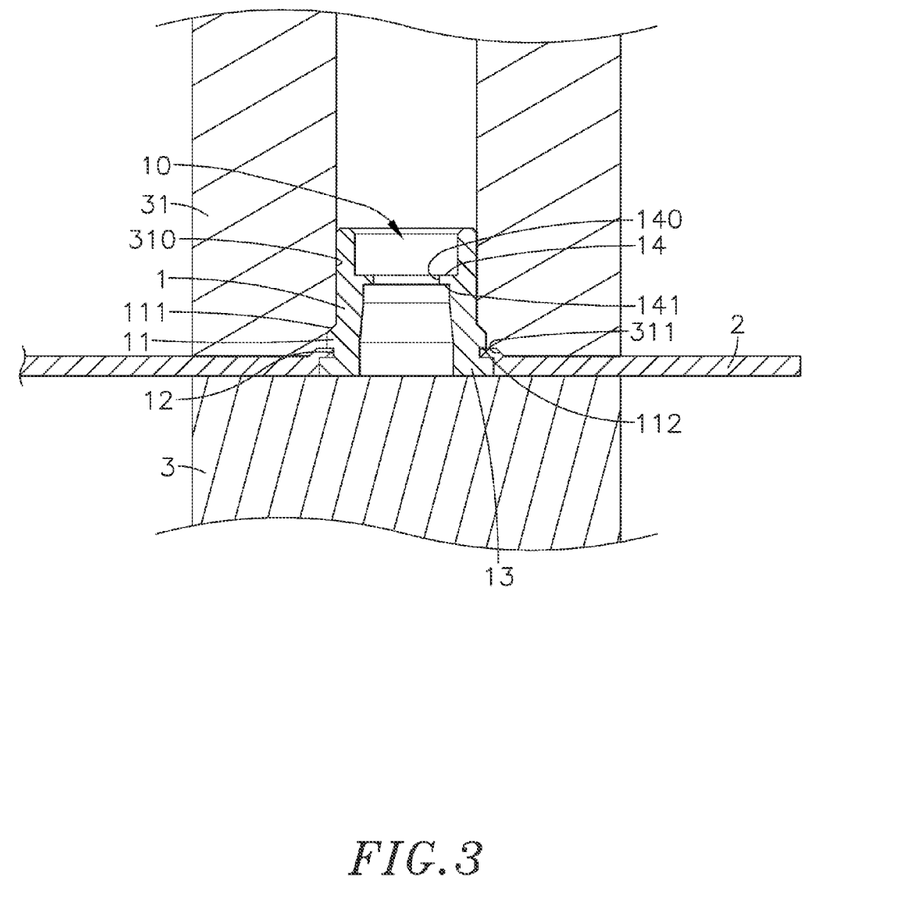
FIG. 3 corresponds to FIG. 2 illustrating the mounting socket and the metal panel member riveted together in the stamping press.

Referring to FIGS. 1, 2 and 3, a floating fastener mounting structure in accordance with the present invention comprises a mounting socket 1, and a metal panel member 2.

The mounting socket 1 is an open-ended cylindrical member comprising a center hole 10 vertically extending through opposing top and bottom sides thereof, an annular step 11 extended around the outer perimeter thereof at a selected elevation, a stop flange 13 extended around the outer perimeter in flush with the bottom wall of the mounting socket, and a annular locating groove 12 extended around the outer perimeter between the annular step 11 and the stop flange 13. The outer diameter of the stop flange 13 is larger than the outer diameter of the annular step 11. Further, the annular step 11 defines a downwardly and outwardly sloping top surface 111.

The metal panel member 2 comprises a mounting through hole 20, and a convex wall portion 21 disposed around the mounting through hole 20 and defining a bottom accommodation space 210 in a bottom side thereof.

The mounting socket 1 is installed in the mounting through hole 20 of the metal panel member 2 subject to the following steps:

(100) Insert the mounting socket 1 upwardly through the mounting through hole 20 of the metal panel member 2.
(101) Move the downwardly and outwardly sloping top surface 111 of the annular step 11 of the mounting socket 1 upwardly relative to the convex wall portion 21 of the metal panel member 2 to force the annular step 11 into friction engagement with the convex wall portion 21 of the metal panel member 2.
(102) Place the temporarily attached mounting socket 1 and metal panel member 2 on a worktable 3 of a stamping press in vertical alignment with a negative mold cavity 310 of a stamping die 31, and then operate the stamping press to stamp the negative mold cavity 310 of the stamping die 31 onto the mounting socket 1, causing the bottom edge 311 of the stamping die 31 around the negative mold cavity 310 to deform the convex wall portion 21 of the metal panel member 2 and to further force the convex wall portion 21 of the metal panel member 2 over the downwardly and outwardly sloping top surface 111 of the annular step 11 of the mounting socket 1 into engagement with the annular locating groove 12 and to further have the convex wall portion 21 of the metal panel member 2 be covered on the outer surface of the stop flange 13 so that the mounting socket 1 is prohibited from displacement either horizontally or vertically relative to the metal panel member 2.
(103) Finish the installation of the metal panel member 2 in the mounting socket 1.

When applying an upward force to the mounting socket 1 to insert the mounting socket 1 upwardly through the mounting through hole 20 of the metal panel member 2, the annular step 11 of the mounting socket 1 can be forced into friction engagement with the convex wall portion 21 of the metal panel member 2 subject to the guidance of the sloping top surface 111 of the annular step 11 of the mounting socket 1, and thus the mounting socket 1 and the metal panel member 2 can be temporarily secured together. After the mounting socket 1 and the metal panel member 2 have been temporarily secured together, place the temporarily attached mounting socket 1 and metal panel member 2 on the worktable 3 of the prepared stamping press in vertical alignment with the negative mold cavity 310 of the stamping die 31. Thereafter, operate the stamping press to stamp the negative mold cavity 310 of the stamping die 31 onto the mounting socket 1. At this time, the bottom edge 311 of the stamping die 31 around the negative mold cavity 310 gives a downward pressure to the convex wall portion 21 of the metal panel member 2, forcing the convex wall portion 21 of the metal panel member 2 to deform and to move downwardly over the downwardly and outwardly sloping top surface 111 of the annular step 11 of the mounting socket 1 into engagement with the annular locating groove 12. At this time, the convex wall portion 21 of the metal panel member 2 fills up the annular locating groove 12, and is tightly stopped between a bottom stop surface 112 of the annular step 11 and stop flange 13, and thus, the mounting socket 1 is riveted to the metal panel member 2 and prohibited from vertical and horizontal displacement relative to the metal panel member 2. Further, riveting the convex wall portion 21 of the metal panel member 2 into the annular locating groove 12 greatly enhances the structural strength of the mounting socket 1 and the metal panel member 2. Further, the diameter of the stop flange 13 is larger than the diameter of the annular step 11. The diameter of the annular step 11 is slightly larger than the diameter of the mounting through hole 20. After the convex wall portion 21 of the metal panel member 2 is forced downwardly over the annular step 11 into the annular locating groove 12 and tightly stopped between a bottom stop surface 112 of the annular step 11 and stop flange 13, the connection between the mounting socket 1 and the metal panel member 2 is enhanced, and the mounting socket 1 is prohibited from displacement or vibration relative the metal panel member 2, and thus, the floating fastener mounting structure has a high shear strength.

Figure 4:
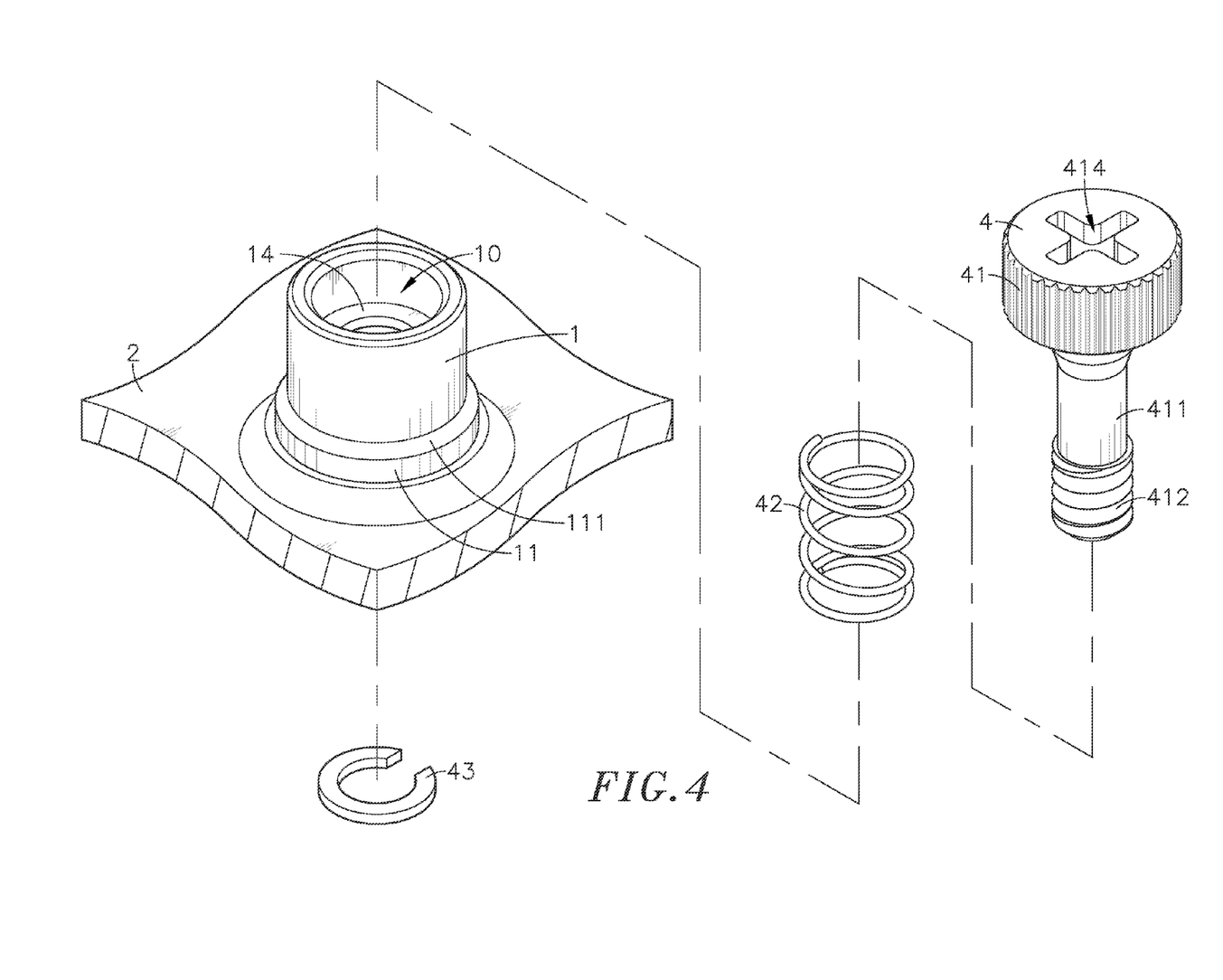
FIG. 4 is an exploded view of the floating fastener in accordance with the present invention.
Figure 5:
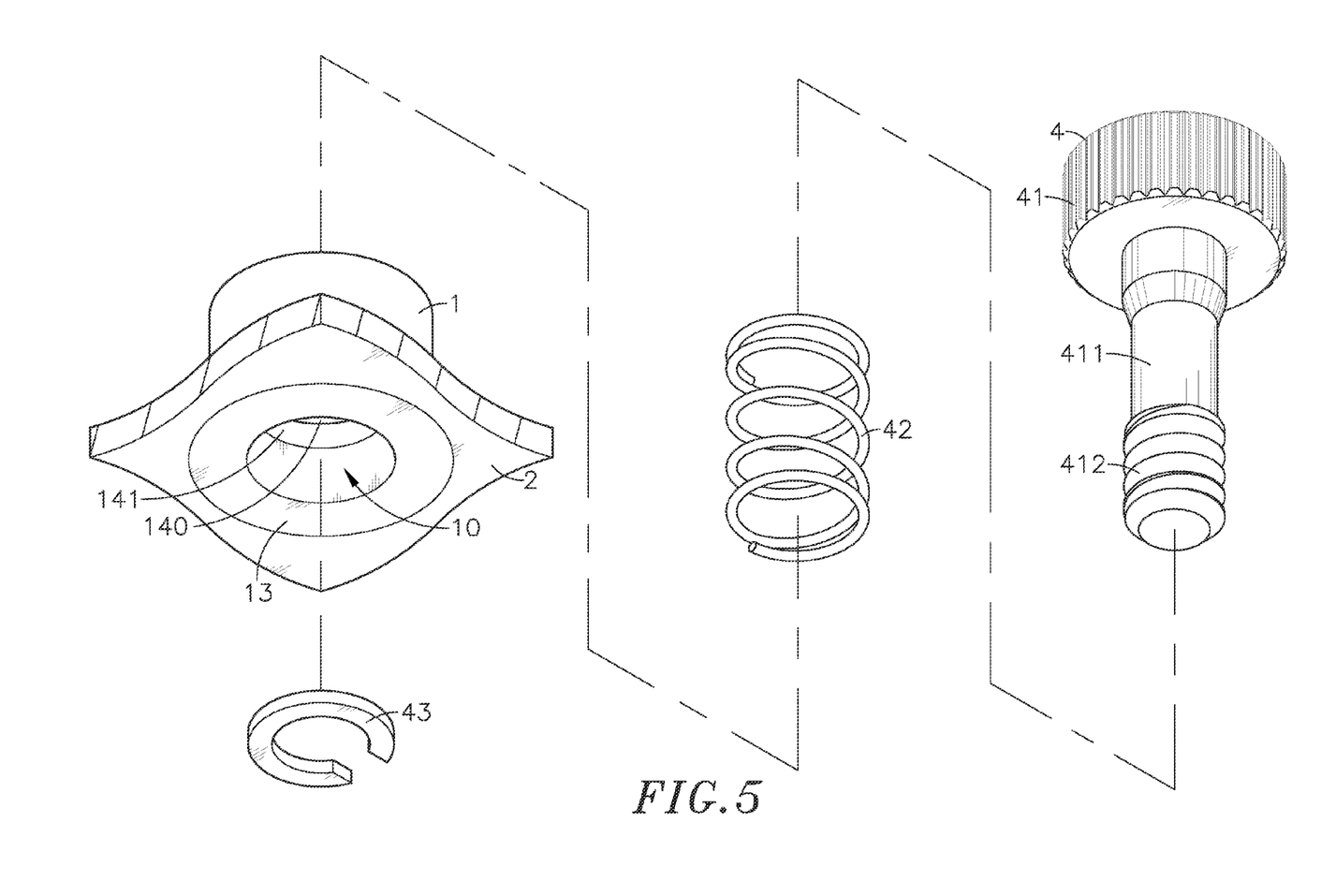
FIG. 5 corresponds to FIG. 4 when viewed from another angle.
Figure 6:
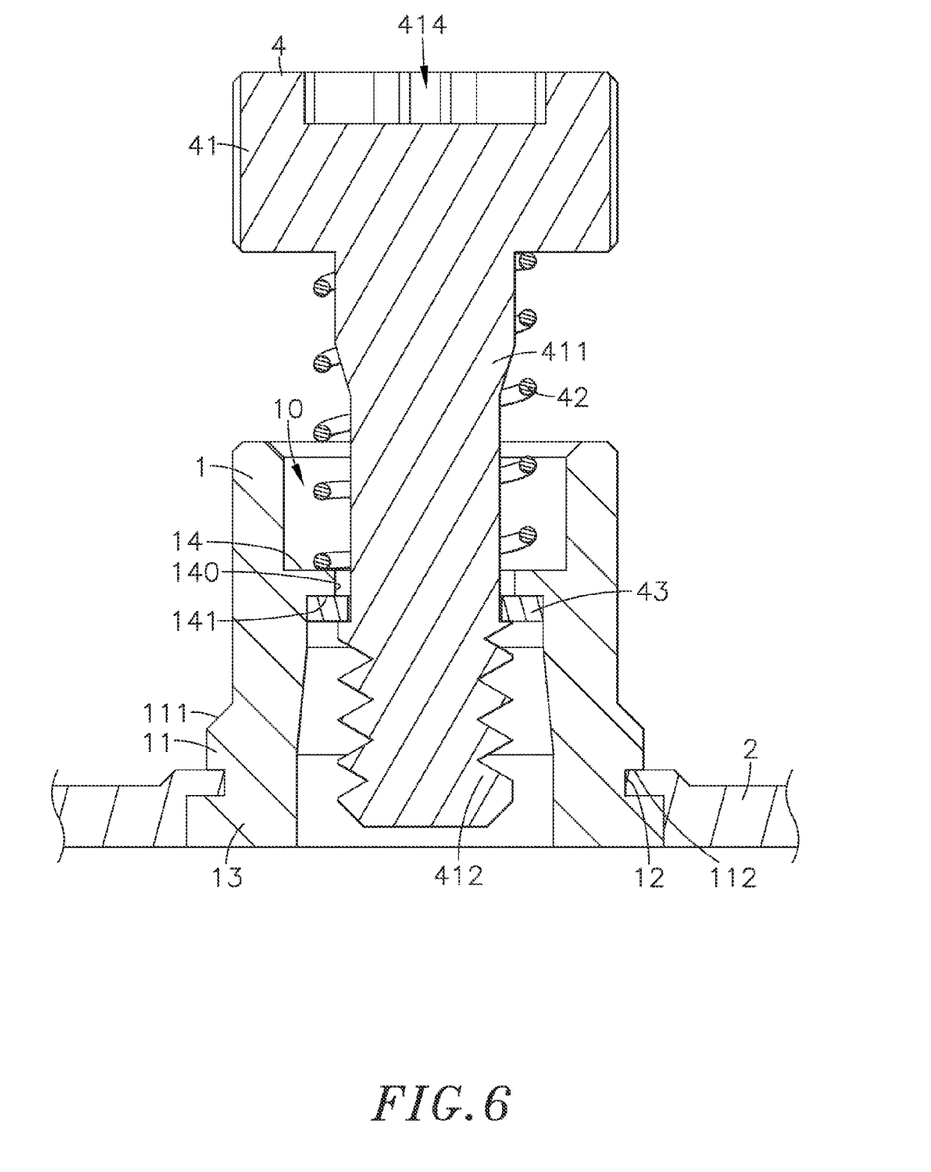
FIG. 6 is a sectional assembly view of the floating fastener shown in FIG. 5.

Referring to FIGS. 4-6 and FIGS. 1 and 3 again, when riveting the metal panel member 2 onto the mounting socket 1 to deform the convex wall portion 21 of the metal panel member 2 and to force it downwardly over the downwardly and outwardly sloping top surface 111 of the annular step 11 of the mounting socket 1 into engagement with the annular locating groove 12 in between the bottom stop surface 112 of the annular step 11 and the stop flange 13, the stop flange 13 of the mounting socket 1 is simultaneously forced into the bottom accommodation space 210 beneath the convex wall portion 21 of the metal panel member 2 and kept in flush with the bottom surface of the metal panel member 2, enhancing the shear strength of the floating fastener mounting structure. The mounting socket 1 further comprises a transverse partition wall 14 disposed in the center hole 10 at a selected elevation, and a through hole 140 cut through opposing top and bottom sides of the transverse partition wall 14 at the center in a concentric manner relative to the center hole 10. A lock screw 4 is inserted through the through hole 140 in the center hole 10 of the mounting socket 1. The lock screw 4 comprises a head 41, an operation portion 414 located on the top wall of the head 41, and a shank 411 perpendicularly and downwardly extended from the bottom wall of the head 41 at the center and terminating in a screw rod 412. A spring member 42 is mounted around the shank 411 of the lock screw 4 in the center hole 10 of the mounting socket 1 and stopped between the head 41 of the lock screw 4 and the top side of the transverse partition wall 14 of the mounting socket 1. Further, a C-shaped retainer 43 is clamped on the shank 411 of the lock screw 4 and stopped between the bottom edge 141 of the transverse partition wall 14 of the mounting socket 1 and the screw rod 412 of the lock screw 4. Thus, the lock screw 4 is floatably positioned in the center hole 10 of the mounting socket 1.

Figure 7:
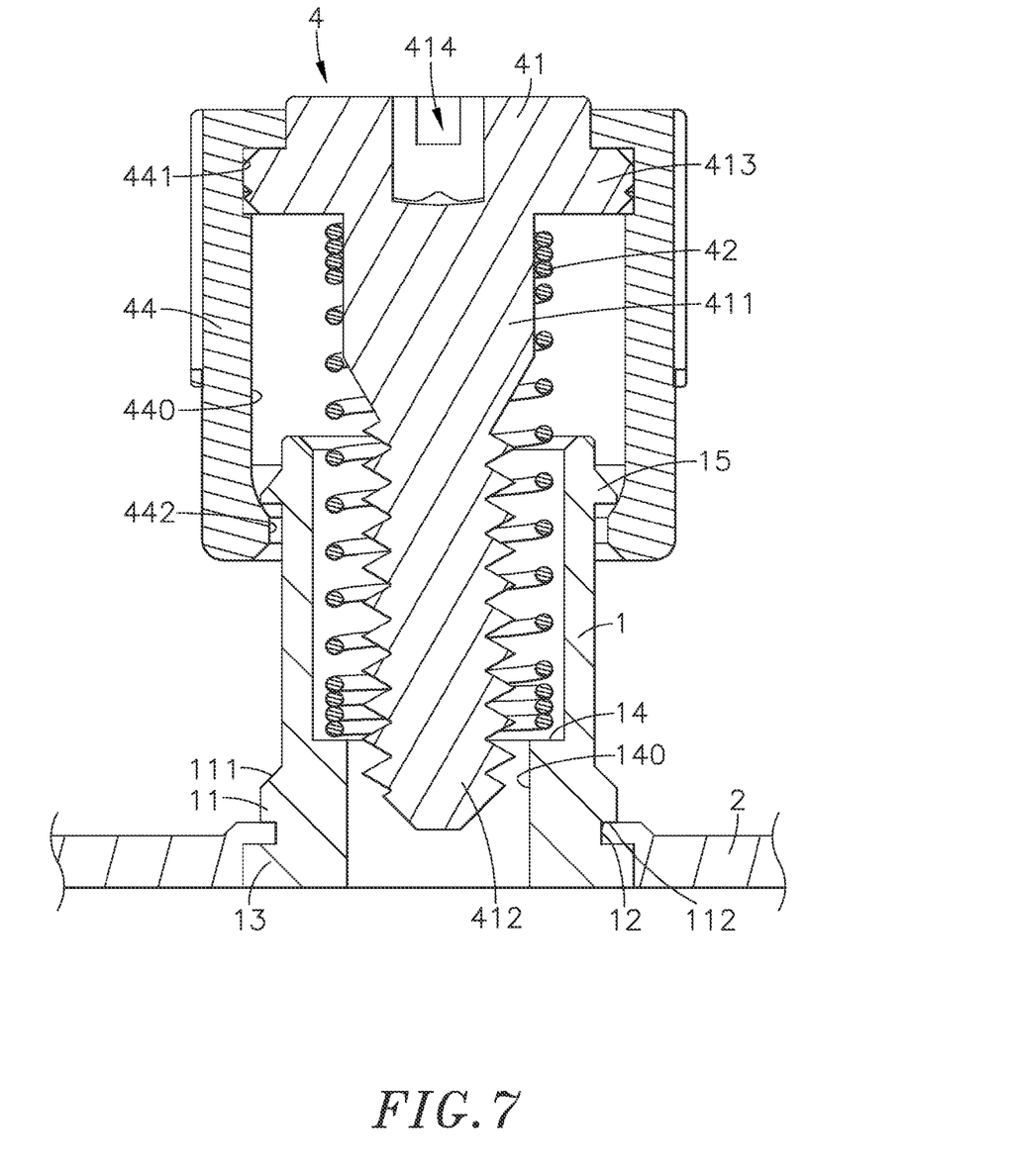
FIG. 7 is a sectional assembly view of an alternate form of floating fastener according to the present invention.

Referring to FIG. 7 and FIGS. 1 and 3 again, an alternate form of the mounting socket 1 can be used. According to this alternate form, the mounting socket 1 further comprises an external top annular flange 15 extending around the outer perimeter near the top side thereof. Further, the diameter of the external top annular flange 15 is smaller than the diameter of the annular step 11. The mounting socket 1 is assembled with a lock screw 4, a cap member 44 and a spring member 42, forming a floating fastener. The lock screw 4 is inserted through the through hole 140 in the center hole 10 of the mounting socket 1, comprising a head 41, a locating flange 413 extending around the periphery of the head 41, an operation portion 414 located on the top wall of the head 41, and a shank 411 perpendicularly and downwardly extended from the bottom wall of the head 41 at the center and terminating in a screw rod 412. The spring member 42 is mounted around the shank 411 of the lock screw 4 in the center hole 10 of the mounting socket 1 and stopped between the head 41 of the lock screw 4 and the top side of the transverse partition wall 14 of the mounting socket 1. The cap member 44 is affixed to the head 41 of the lock screw 4 and axially slidably coupled to the mounting socket 1. As illustrated, the cap member 44 comprises a top center hole 440 press-fitted onto the periphery of the head 41 of the lock screw 4 above the locating flange 413, a locating groove 441 extending around an inner perimeter thereof and forced into engagement with the locating flange 413 of the lock screw 4 tightly, and an inside coupling flange 442 protruded from the inner perimeter at a bottom side. Subject to the elastic material property of the cap member 44, the inside coupling flange 442 of the lock screw 4 can be forced downwardly over the external top annular flange 15 of the mounting socket 1 and slidably coupled to the periphery of the mounting socket 1 between the external top annular flange 15 and the annular step 11.

Further, the operation portion 414 of the lock screw 4 can be a tool slot, for example, straight slot, crossed slot, star shaped slot or hexagonal slot. Alternatively, the operation portion 414 can be a block, for example, straight block, crossed block, star shaped block or hexagonal block protruded from the top wall of the head 41 of the lock screw 4. A mating screwdriver, wrench or hand tool can be attached to the operation portion 414 and operated to turn the lock screw 4.

In conclusion, when assembling the mounting socket 1 and metal panel member 2 of the floating fastener mounting structure, insert the mounting socket 1 upwardly through the mounting through hole 20 of the metal panel member 2 to force the annular step 11 of the mounting socket 1 into friction engagement with the convex wall portion 21 of the metal panel member 2 subject to the guidance of the sloping top surface 111 of the annular step 11 of the mounting socket 1. After the mounting socket 1 and the metal panel member 2 have been temporarily secured together, the temporarily attached mounting socket 1 and metal panel member 2 is placed on the worktable 3 of the prepared stamping press in vertical alignment with the negative mold cavity 310 of the stamping die 31, and then the stamping press is operated to stamp the negative mold cavity 310 of the stamping die 31 onto the mounting socket 1, forcing the bottom edge 311 of the stamping die 31 around the negative mold cavity 310 downwardly against the convex wall portion 21 of the metal panel member 2 to deform the convex wall portion 21 of the metal panel member 2 and to move it downwardly over the downwardly and outwardly sloping top surface 111 of the annular step 11 of the mounting socket 1 into engagement with the annular locating groove 12. Thus, the convex wall portion 21 of the metal panel member 2 can fill up the annular locating groove 12 and be tightly stopped between a bottom stop surface 112 of the annular step 11 and stop flange 13 to prohibit the mounting socket 1 from displacement relative to the metal panel member 2. Further, riveting the convex wall portion 21 of the metal panel member 2 into the annular locating groove 12 greatly enhances the structural strength of the mounting socket 1 and the metal panel member 2. Further, the diameter of the stop flange 13 is larger than the diameter of the annular step 11. The diameter of the annular step 11 is slightly larger than the diameter of the mounting through hole 20. After the convex wall portion 21 of the metal panel member 2 is forced downwardly over the annular step 11 into the annular locating groove 12 and tightly stopped between a bottom stop surface 112 of the annular step 11 and stop flange 13, the connection between the mounting socket 1 and the metal panel member 2 is enhanced, and the mounting socket 1 is prohibited from displacement or vibration relative the metal panel member 2, and thus, the floating fastener mounting structure has a high shear strength. Further, the through hole 140 in the transverse partition wall 14 inside the mounting socket 1 is provided for the insertion of a lock screw 4 comprising a head 41, a shank 411 and a screw rod 412 and mounting of a spring member 42 in the center hole 10 of the mounting socket 1 between the head 41 of the lock screw 4 and the transverse partition wall 14 of the mounting socket 1. Thus, the lock screw 4 is floatably positioned in the center hole 10 of the mounting socket 1.

In actual application, the invention has the following advantages and features:
1. Subject to the matching design between the annular step 11, annular locating groove 12 and stop flange 13 of the mounting socket 1 and the mounting through hole 20 and convex wall portion 21 of the metal panel member 2, the mounting socket 1 and the metal panel member 2 can be tightly riveted together, providing high shear strength. In riveting, the convex wall portion 21 of the metal panel member 2 is deformed and forced downwardly over the downwardly and outwardly sloping top surface 111 of the annular step 11 into engagement with the annular locating groove 12 and tightly stopped between the bottom stop surface 112 of the annular step 11 and the stop flange 13 to prohibit the mounting socket 1 from displacement relative to the metal panel member 2, enhancing the structural strength of the connection area between the mounting socket 1 and the metal panel member 2 and the shear strength of the whole assembly against breaking.

2. After the mounting socket 1 and the metal panel member 2 are tightly riveted together, the mounting socket 1 can be assembled with a lock screw 4 and a spring member 42 and a C-shaped retainer 43 or cap member 44 to form a floating fastener for detachably and positively locking the metal panel member 2 to another metal panel member.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A floating fastener mounting structure, comprising a metal panel member, a mounting socket affixed to said metal panel member, a lock screw mounted in said mounting socket, and a spring member mounted in said mounting socket to floatably support said lock screw in said mounting socket, wherein:

said metal panel member comprises a mounting through hole, and a convex wall portion disposed around said mounting through hole and defining a bottom accommodation space;

said mounting socket is upwardly inserted through said mounting through hole of said metal panel member and riveted to said metal panel member, said mounting socket comprising a center hole vertically extending through opposing top and bottom walls thereof for accommodating said lock screw and said spring member, an annular step extended around the outer perimeter thereof at a selected elevation, a stop flange extended around the outer perimeter of said mounting socket below said annular step, and a annular locating groove extended around the outer perimeter between said annular step and said stop flange, the outer diameter of said stop flange being larger than the outer diameter of said annular step, said annular step defining a downwardly and outwardly sloping top surface for guiding said convex wall portion of said metal panel member downwardly over said annular step into engagement with said annular locating groove.

2. The floating fastener mounting structure as claimed in claim 1, wherein said convex wall portion of said metal panel member is engaged into said annular locating groove of said mounting socket and covered over said stop flange of said mounting socket and tightly stopped between said annular step and said stop flange to prohibit said mounting socket from vertical and horizontal displacement relative to said metal panel member.

3. The floating fastener mounting structure as claimed in claim 1, wherein said mounting socket further comprises a transverse partition wall disposed in said center hole, and a through hole cut through opposing top and bottom sides of said transverse partition wall at the center; said lock screw comprises a head disposed outside said mounting socket, and a shank perpendicularly and downwardly extended from a bottom wall of said head at the center and terminating in a screw rod and inserted through the through hole on said transverse partition wall in said center hole of said mounting socket; said spring member is mounted around said shank of said lock screw in said center hole of said mounting socket and stopped between said head of said lock screw and the top side of said transverse partition wall of said mounting socket.

4. The floating fastener mounting structure as claimed in claim 3, further comprising a C-shaped retainer clamped on said shank of said lock screw and stopped between a bottom edge of said transverse partition wall of said mounting socket and said screw rod of said lock screw.

5. The floating fastener mounting structure as claimed in claim 1, wherein said mounting socket further comprises a transverse partition wall disposed in said center hole, a through hole cut through opposing top and bottom sides of said transverse partition wall at the center, and an external top annular flange extending around the outer perimeter near the top side thereof; said lock screw comprises a head disposed outside said mounting socket, a shank perpendicularly and downwardly extended from a bottom wall of said head at the center and terminating in a screw rod and inserted through the through hole on said transverse partition wall in said center hole of said mounting socket, and a cap member affixed to said head and axially slidably coupled to the outer perimeter of said mounting socket between said external top annular flange and said annular step of said mounting socket; said spring member is mounted around said shank of said lock screw in said center hole of said mounting socket and stopped between said head of said lock screw and the top side of said transverse partition wall of said mounting socket.

6. The floating fastener mounting structure as claimed in claim 5, wherein said external top annular flange has a diameter smaller than the diameter of said annular step.

7. The floating fastener mounting structure as claimed in claim 5, wherein said stop flange of said mounting socket is disposed in flush with the bottom wall of said mounting socket and accommodated in said bottom accommodation space of said metal panel member.

8. The floating fastener mounting structure as claimed in claim 5, wherein said lock screw further comprises an operation portion located on a top wall of said head in one of the forms of straight slot, crossed slot, star shaped slot, hexagonal slot, straight block, crossed block, star shaped block and hexagonal block, for the positioning of a hand tool operable to rotate said lock screw.

9. The floating fastener mounting structure as claimed in claim 5, wherein said lock screw further comprises a locating flange extending around the periphery of said head; said cap member comprises a top center hole press-fitted onto the periphery of said head and stopped above said locating flange, and a locating groove extending around an inner perimeter thereof and forced into engagement with said locating flange of said lock screw.

* * * * *